May 9, 1950
S. M. GOODRICH
2,506,868
TOOL TO DETERMINE ANGLE AND LENGTH OF
LIPS OF TWIST DRILLS
Filed July 30, 1947
2 Sheets-Sheet 1
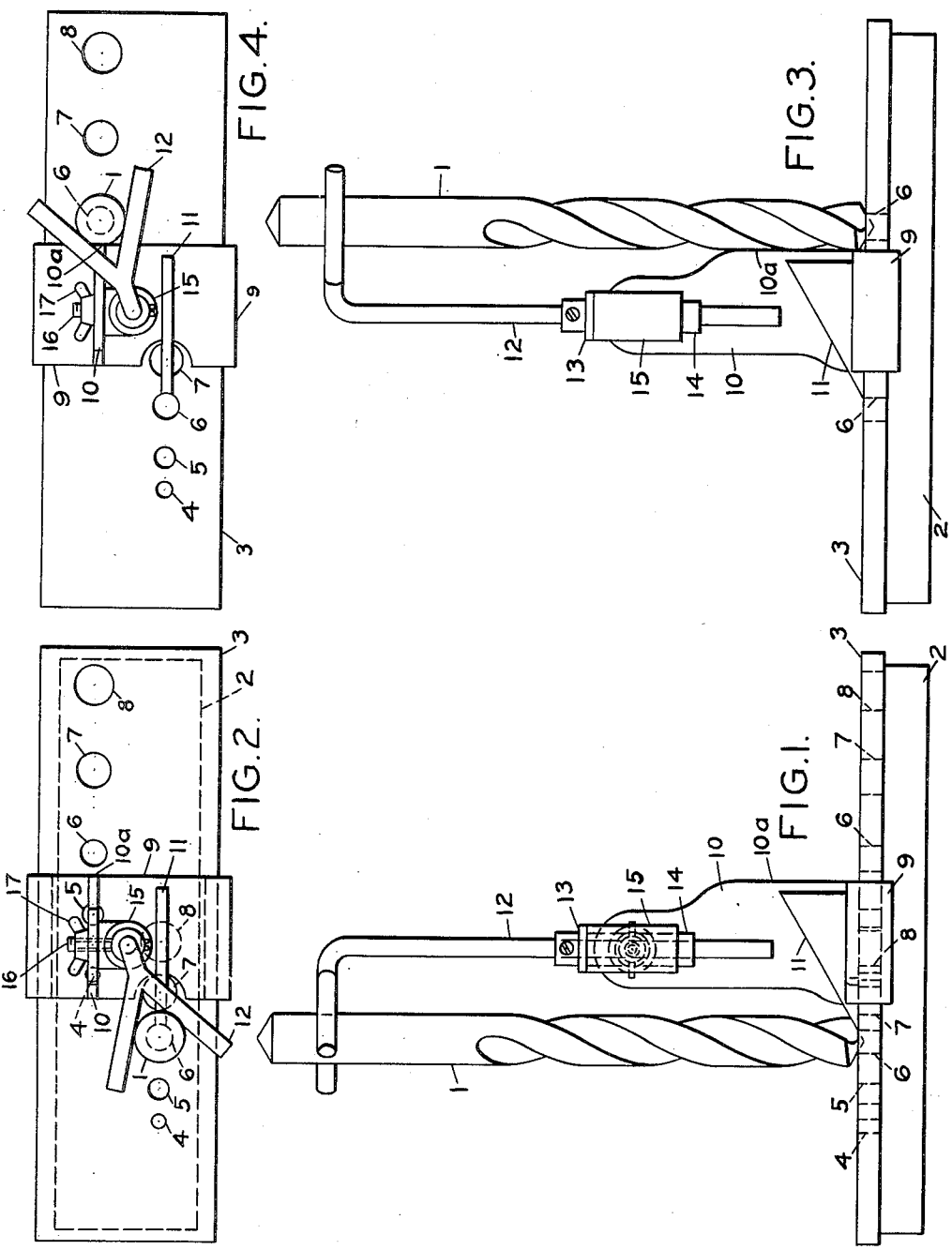
INVENTOR.
S. Max Goodrich
BY
Samuel H. Davis May 9, 1950  S. M. GOODRICH  2,506,868
TOOL TO DETERMINE ANGLE AND LENGTH OF
LIPS OF TWIST DRILLS
Filed July 30, 1947  2 Sheets-Sheet 2
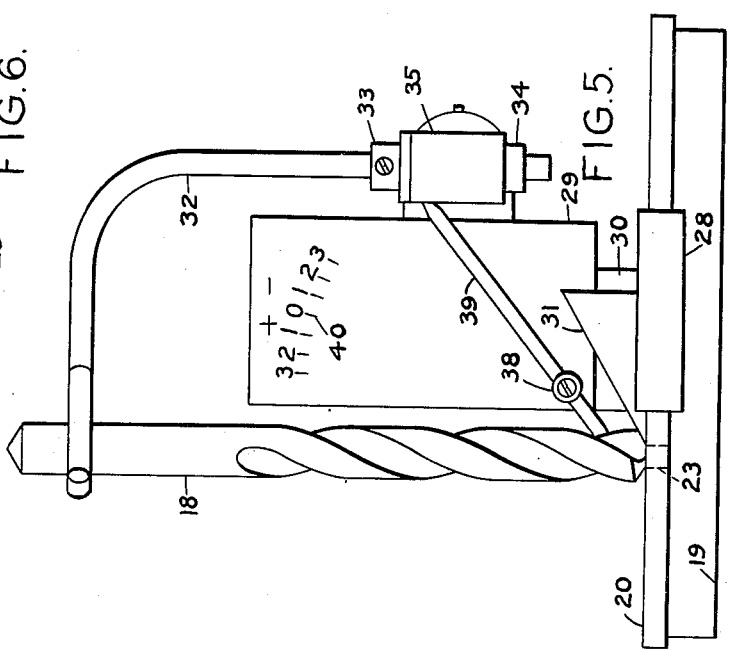
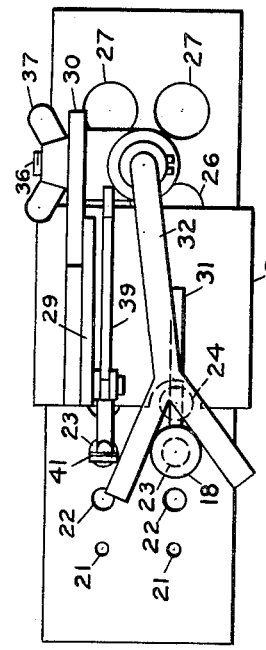
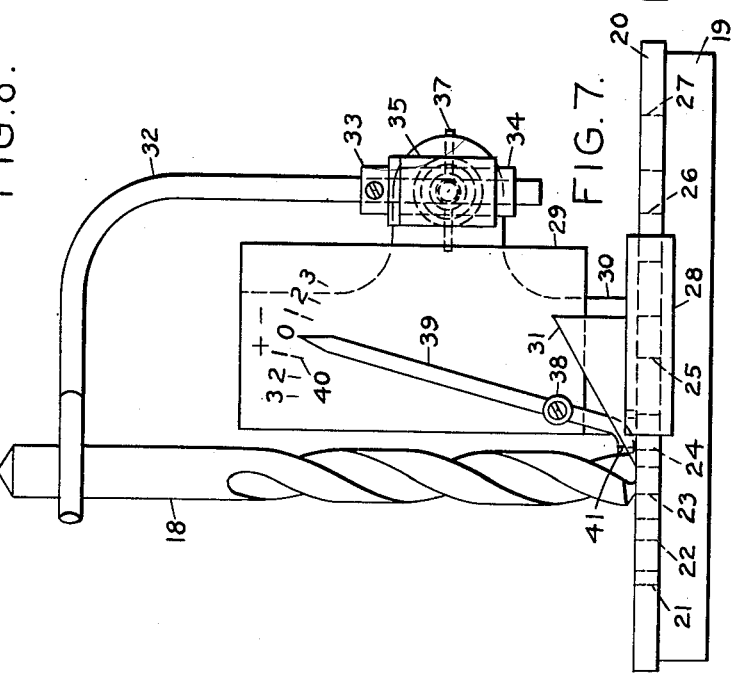
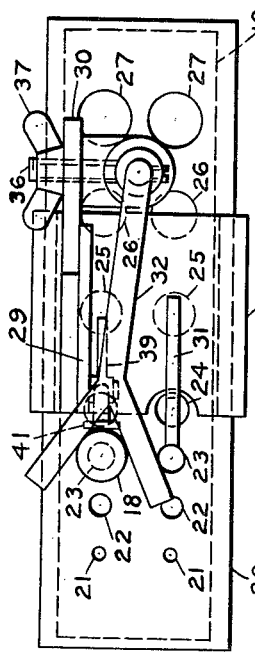
INVENTOR.
S. Max Goodrich
BY
Samuel H. Davis Patented May 9, 1950

2,506,868

UNITED STATES PATENT OFFICE 2,506,868

TOOL TO DETERMINE ANGLE AND LENGTH
OF LIPS OF TWIST DRILLS

S Max Goodrich, Lansing, Mich.

Application July 30, 1947, Serial No. 764,618

1 Claim. (Cl. 33—201)

This invention relates to tools useful in grinding the lips of twist drills, and is particularly concerned with a tool for determining the angles of the cutting lips of twist drills.

In the use of twist drills particularly for boring holes in metals it is very important that the two cutting lips of the drill have the proper angle in respect to the axis of the said drill. Obviously, the angle of the cutting lip determines the length of the same, and it is for this reason that the angles of each of the two cutting lips be the same. Should the angle of the cutting lips vary the hole formed by the drill will be of greater diameter than the diameter of the said drill. It is therefore very important that the two lips of the cutting edge of a twist drill have the same angle and therefore be of the same length.

In the past resort has been made to the use of a graduated scale for determining the angle and length of the cutting lips of a twist drill. There are serious objections to the use of such tools because each lip must be measured at a time and this is time consuming and such practice is at best substantially inaccurate.

It is an object of this invention to provide a tool by the use of which the angles of the lips of the drill can be determined rapidly. It is a further object to provide a tool whereby the angles of such lips can be determined substantially accurately. It is a further object to provide a tool whereby the angles of the lips of twist drills may be determined by a worker who possesses only a limited amount of mechanical skill.

I have now discovered and invented a tool for use in gauging the angle and length of the lips of twist drills, comprising a base, the said base having a plurality of holes of varying diameters for resting twist drills thereby, a slider slidably attached to the upper portion of the said base, an adjustable perpendicular attachment securely attached to the said slider, a portion of one side of the said perpendicular attachment being perpendicular to the said base adapted to aid in aligning the drill perpendicularly with respect to the base, a V-shaped adjustable steady rest rotatably attached by means of its post to the said adjustable perpendicular attachment by means of bearings, and an angle plate for testing the lip angles of the drills, the said angle plate being slidably attached to the said slider, and I am now able to avoid the disadvantages of the prior art and am readily able to accomplish the objects set forth.

Referring to the drawings:

Fig. 1 is a front view showing this invention as used to gauge the lip angle of a drill.

Fig. 2 is a top view of Fig. 1.

Fig. 3 is a front view showing this invention as used to gauge the centering of a drill.

Fig. 4 is a top view of Fig. 3.

Figs. 5, 6, 7, and 8, show a modification of the invention.

The base block 2, shown in Figs. 1, 2, 3, and 4, has mounted thereon by welding another block 3. The block 3 has a series of holes drilled therethrough. These holes are of varying diameters adapted to accommodate drills of different common sizes. The drill 1 is mounted on the tool of my invention by inserting the cutting point into one of the said holes. The upper end or the shank of the drill is held perpendicularly in respect to the base 2, and is held by means of a V-shaped steady rest 12. The steady rest is adjustable and may be rotated by means of bearings or brought to rest at the desired degree by means of a set screw. The said set screw is made up of the stud bolt 16 threaded into the cylindrical bearing 15, and the wing nut 17 which is threaded on the stud bolt 16. One side of 10a of the perpendicular base is accurately ground to be perpendicular in respect to the base 3, and the base 2, and is adapted to aid in alignment of the drill 1. The slider 9 is slidably attached to the upper base 3 by means of projecting clasps on each side thereof, and the said clasps envelop a portion of the projecting outer edges of the base 3. In this manner the said slider may be moved lengthwise along the upper base 3. Since the perpendicular base 10 is securely attached to the said slider the portion holding the drill, including the drill, may be moved along the block so that the said drill may be aligned to rest in any of the holes 4, 5, 6, 7, or 8. By moving the slider 9 and by swinging the V-shaped rest the drill may be made to rest in the desired hole. The angle plate 11 is slidably attached or welded to the slider 9. The said angle plate 11 is used for determining the proper angle of the lips of twist drills.

The drill 1 is placed against the V-shaped steady rest 12, and the slider 9 and the perpendicular attachment 10 are adjusted on the base plate 3 so that the cone of the drill rests in the hole 6. The angle plate 11 is slid under the drill so that a portion of the angle is beneath the lip of the drill. The drill is then rotated to determine the angle of the lip by observing for the presence or absence of light between the cutting edges and the angle plate. When light is seen between one or both of the cutting edges and the angle plate, one or both of the lips must be ground down to the proper angle. When no light is seen between either of the cutting edges and the angle plate, the drill is swung until the cone of the drill rests in the said hole. The drill 1 is placed against the edge 10a so that the drill and the said edge are in contact with each other. The drill is then rotated to determine if light is seen between the edge 10a and the drill. When light can be seen between the said drill and the said edge the drill needs to be reground.

Referring now to the modification of the tool which is shown in Figs. 5, 6, 7, and 8, the base block 19 has mounted thereon by welding another block 20. The block 20 has a series of holes drilled therethrough. These holes are of varying diameters adapted to accommodate drills of different common sizes. The drill 18 is mounted on the tool of my invention by inserting the cutting point into one of the said holes. The upper end of the shank of the drill is held perpendicularly in respect to the base 19, and is held by means of the V-shaped steady rest 32. The steady rest is adjustable and may be rotated by means of bearings or brought to rest at the desired degree by means of a set screw. The said set screw is made up of the stud bolt 36, threaded into the cylindrical bearing 38, and the wing nut 37 which is threaded on the stud bolt 36. The slider 28 is slidably attached to the upper base 20 by means of projecting clasps on each side thereof, and the said clasps envelop a portion of the projecting outer edges of the base 20. In this manner the said slider may be moved lengthwise along the upper base 20. The gauge plate 29 is welded to the support 30. Since the support 30 is securely attached to the said slider, the portion holding the drill, including the drill may be moved along the block so that the said drill may be aligned to rest in either of the holes 21, 22, 23, 24, 25, 26, or 27, by moving the slider and by swinging the V-shaped rest 32, the drill may be made to rest in the desired hole.

The pointer 39 is moved about the bearing 38. The scale 40 is situated to coincide with the point portion of the said pointer. The other end of the said pointer has a bar 41 attached thereto and is situated to contact the perpendicular helical portion of the drill.

The drill 18 is placed against the V-shaped steady rest and the slider 28 and the support 30 are adjusted on the base plate 28 so that the cone of the drill rests in the lower hole 23. The drill is then rotated to determine if both cutting edges rest against the angle plate 31. If light shows between one or both cutting edges and the angle plate, one or both edges need to be reground and retested. If both edges show no light between them and the angle plate the V-shaped steady rest and the drill are swung upward until the cone of the drill rests in the upper hole 23. The bar 41 is placed against the drill and it is rotated. If the centering of the drill is correct, the upper end of the pointer will rest on zero of the scale. If the pointer comes to rest on either side of zero the drill need be reground.

I wish to point out that the bar 41 attached integrally to the lower end of the pointer 39 is important in that it serves in preventing the said lower end of the pointer from falling into the helical groove portion of the drill. As the drill is rotated and the bar is in contact with the helical portion of one of the lips, the said bar extends sufficiently to come in contact with a portion of the other helical portion of the other lip of the drill and thereby preventing the lower end of the pointer, or the bar 41, from falling into the said helical groove.

It is apparent that I have provided a simple and inexpensive tool for the use intended and wish particularly to point out that while the embodiment of the present invention as herein disclosed, constitutes preferred forms, it is understood that other forms might be adopted, all coming within the scope of the claim which follows.

I claim:

A tool for use in gauging the angle and length of the lips of twist drills, comprising a base, the said base having a plurality of holes of varying diameters for resting twist drills therein, a slider slidably attached to the upper portion of the said base, an adjustable perpendicular attachment securely attached to the said slider, a portion of one side of the said perpendicular attachment being perpendicular to the said base adapted to aid in aligning the drill perpendicularly with respect to the said base, a V-shaped adjustable steady rest rotatably attached by means of a post to the said adjustable attachment by means of bearings, and an angle plate for testing the lip angles of drills, the said angle plate being attached to the said slider.

S MAX GOODRICH.

REFERENCES CITED

The following references are of record in the file of this patent:

UNITED STATES PATENTS

| Number | Name | Date |
| --- | --- | --- |
| 990,668 | Reimann | Apr. 25, 1911 |
| 2,337,819 | Hofmann | Dec. 28, 1943 |

FOREIGN PATENTS

| Number | Country | Date |
| --- | --- | --- |
| 218,399 | Switzerland | Dec. 15, 1941 |